United States Patent [19]

Kuroda

[11] Patent Number: 5,787,276
[45] Date of Patent: Jul. 28, 1998

[54] MICROPROCESSOR INCLUDING CIRCUIT FOR GENERATING SIGNAL USED FOR TRACING EXECUTED INSTRUCTION STREAM

[75] Inventor: Yasuaki Kuroda, Tokyo, Japan

[73] Assignee: NEC Corporation, Tokyo, Japan

[21] Appl. No.: 267,917

[22] Filed: Jul. 6, 1994

[30] Foreign Application Priority Data

Jul. 7, 1993  [JP]  Japan .................................. 5-191789

[51] Int. Cl.⁶ .................................................. G06F 9/34
[52] U.S. Cl. ................................... 395/581; 395/384
[58] Field of Search ................................ 395/375, 775

[56] References Cited

U.S. PATENT DOCUMENTS

| 4,763,253 | 8/1988 | Bluhm et al. . |
| 5,050,076 | 9/1991 | Misaka . |
| 5,421,026 | 5/1995 | Sato et al. .............................. 395/800 |

FOREIGN PATENT DOCUMENTS

| 0239023 | 9/1987 | European Pat. Off. . |
| 0471888A2 | 9/1992 | European Pat. Off. . |
| 61-168046 | 7/1986 | Japan . |

OTHER PUBLICATIONS

"Keeping Jump Instructions Out of the Pipeline of a RISC-Like Computer"; Maurice V. Wilkes; Digital Equipment Corp. and MIT; V 8345 Computer Archit. News, Nov. 1983; pp. 5–7.

*Primary Examiner*—Jack B. Harvey
*Assistant Examiner*—Jigar Pancholi
*Attorney, Agent, or Firm*—Whitham, Curtis & Whitham

[57] ABSTRACT

A microprocessor which is constructed to output outside a pipeline flash signal in response to a branch caused by a conditional branch instruction being to be taken, includes a decoder unit decoding and producing decoded information of each of instructions to be executed, the decoder unit further producing branch conduction information designated by the conditional branch instruction, a latch latching the decoded information in response to a write-enable signal and outputting it in response to a read-enable signal, an execution unit performing a data processing operation in response to the decoded information from the latch and including a status word register for temporarily storing an execution state thereof, and a branch detection unit for detecting whether or not a branch is to be taken in response to the branch condition information and the execution state and responding to the write-enable signal to produce a detection signal when the branch is detected to be taken, the pipeline flash signal being thereby generated in response to the detection signal.

21 Claims, 5 Drawing Sheets

MICROPROCESSOR INCLUDING CIRCUIT FOR GENERATING SIGNAL USED FOR TRACING EXECUTED INSTRUCTION STREAM

BACKGROUND OF THE INVENTION

The present invention relates to a microprocessor and, more particularly, to a microprocessor constructed in a pipelined manner and provided with a function of generating a signal used for tracing an instruction stream which is actually executed.

Such a microprocessor according to the prior art has a circuit construction shown in FIG. 1, as disclosed in Japanese Laid-Open Application No. Sho 61-168046. The microprocessor shown in FIG. 1 includes an instruction execution unit 23 for executing a string of instructions, an instruction queue 15 for temporarily storing prefetched instructions to be executed, a signal line 100 supplied with a prefetch-invalidating signal from the outside, and a signal line 104 from which an instruction fetch request signal is outputted outside.

In operation, when the instruction execution unit 23 completes the current instruction, it requests through an instruction request signal 103 a queue controller 18 to transfer a next instruction. The controller 18 further receives the output signal of an AND gate 106 receiving a queue not-empty signal 101 from the queue 15 and an inverted signal of the signal 100 by an inverter 107. The signal 101 takes an active high level when the queue 15 is not in an empty state but stores at least one instruction. So long as the signal 100 takes an inactive low level, the signal 101 is not masked and thus is transferred to the controller 18. Although not shown, the controller responds to the high level of the output of the AND gate 106 to command to initiate an instruction prefetch operation. In response thereto, a prefetch unit (not shown) performs an instruction prefetch bus cycle on an external memory (not shown) during a bus being free to prefetch instructions. The instructions thus prefetched are stored into the queue 15 through a data bus 8 and a multiplexer 108. When the output signal of the AND gate 106 is changed to the low level by the low level of the signal 101, the controller 18 generates the fetch signal 104 to make an access to the external memory to fetch instructions therefrom and transfer them to the unit 23. The controller 18 further responds to the instruction request signal 103 from the execution unit 23 to command the queue 15 to transfer the instruction stored therein to the unit 23.

When the prefetch-invalidating signal is forcibly held at an active high level by the external source (not shown), the output signal of the AND gate 107 is held at the low level irrespective of the level of the signal 101. This means that the queue 15 is in an empty state. The controller 18 thereby issues the signal 104 to initiate an instruction fetch cycle to fetch an instruction from the external memory. The instruction thus fetched is transferred through the data bus 8 and the multiplexer 108 to the execution unit 23, as described above. This instruction fetch operation is initiated each time the instruction request signal 103 is generated by the execution unit 23 so long as the signal 100 and accordingly the output of the AND gate 106 are held at the high level and the low level, respectively. Thus, the signal 104 is changed to the active level each time the instruction request signal 103 is generated. Accordingly, by monitoring the level of the signal 104, the instruction stream executed by the execution unit 23 can be traced.

However, the signal 104 is produced to take the active level only in response to the execution unit 23 generating the signal 103. The signal 103 is generated not only when each instruction in the current instruction stream but also when a branch target instruction at a branch address caused by a branch being taken. For this reason, the signal 104 can not be used for tracing a change in the instruction stream caused by taking a branch.

SUMMARY OF THE INVENTION

It is therefore an object of the present invention to provide an improved microprocessor constructed in a pipelined manner.

It is another object of the present invention to provide a microprocessor having a signal generation circuit for generating a signal or signals used for tracing an instruction stream as well as the change in instruction system steam caused by taking a branch.

A microprocessor according to the present invention comprises decoder unit receiving instructions and producing decoded information of each of the instructions, the decoder unit further producing branch condition information in response to a conditional branch instruction supplied thereto, a latch for latching the decoded information from the decoder unit in response to a write-enable signal and outputting it in response to a read-enable signal, an execution unit performing a data processing operation in response to the decoded information outputted from the storage unit, the execution unit including a program status word register for temporarily storing an execution state of the execution unit, a branch detection unit coupled to the decoder unit and status word register for detecting whether a branch is taken or not in response to branch condition information and the execution state and for generating in response to the write-enable signal a detection signal when the branch is detected to be taken, and an output buffer responding to the detection signal and generating a pipeline flash signal.

With the above-mentioned construction, the pipeline flash signal responsive to a branch to be taken, so that it become possible to trace an instruction stream actually executed.

BRIEF DESCRIPTION OF THE DRAWINGS

The above and other objects, features and advantages of the present invention will be more apparent from the following description taken in conjunction with the accompanying drawings, wherein.

DETAILED DESCRIPTION OF THE PREFERRED EMBODIMENTS

Figure 2:
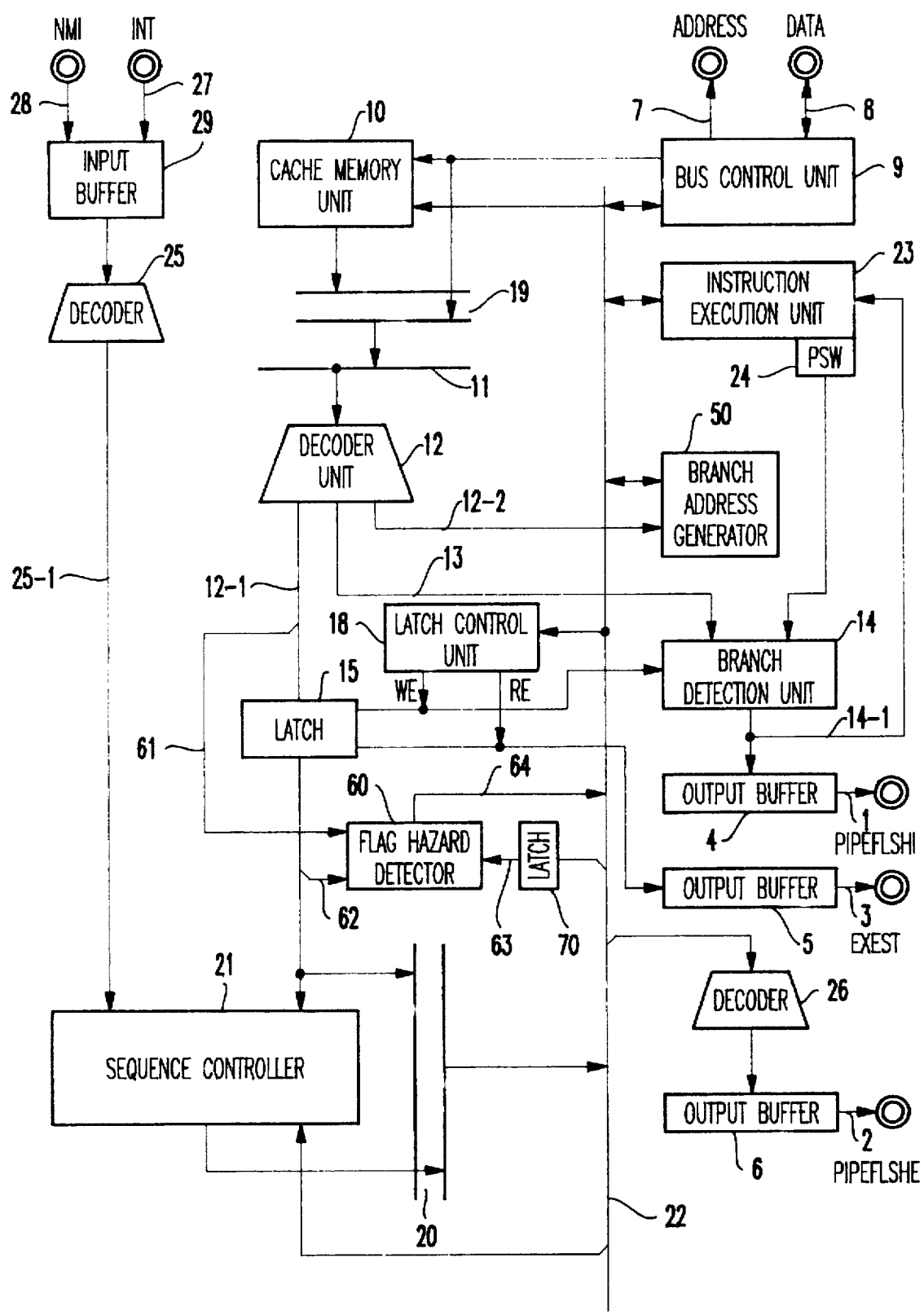
FIG. 2 is a block diagram illustrative of a microprocessor according to an embodiment of the present invention.

Referring now to FIG. 2, a microprocessor according to an embodiment of the present invention includes a sequence controller 21 including a microprogram memory (not shown) storing a plurality of strings of microinstructions each for executing a corresponding one of macroinstructions stored in an external memory (not shown) as a user's program, a bus control unit accessing the external memory through an address bus 7 and a data bus 8, a cache memory unit 10, selectors 19 and 20, an instruction decoder 12, an instruction latch 15, a latch controller 18, an interrupt request decoder 25, an instruction execution unit 23 having a program status word register (PSW) 24, a branch detection unit 14, a branch address generator 50, a flag hazard detection unit 60, an input buffer 29 and output buffers 4-6, which are coupled to one another as shown via various control signals and an internal bus. This internal bus includes an instruction bus 11 and a internal data/control bus 22.

The cache memory unit 10 copies a part of the instructions stored in the external memory. When the bus control unit 9 is required to initiate a bus cycle to fetch an instruction, it is checked whether or not the instruction to be executed is stored in the cache memory unit 10 by use of an access address therefor. If stored, a so-called cache-hit occurs and the instruction is read out from the cache memory unit 10 and transferred to the instruction bus 11 via the selector 19. On the other hand, if not stored, the cache-miss-hit is informed, so that the bus cycle is performed by the bus control unit 9 to read out the instruction from the external memory. The instruction thus read out is transferred through the data bus 8 and the selector 19 to the instruction bus 11 and further copied into the cache memory unit 10.

The instruction thus transferred onto the bus 11 is supplied to the instruction decoder unit 12. The decoder unit 12 decodes the instruction supplied thereto and produces and outputs decoded instruction information onto a decoded instruction bus 12-1. In case where an instruction to be decoded is a conditional branch instruction, the decoder unit 12 further produces and outputs branch condition information contained in the conditional branch instruction onto a branch condition designation bus 13. The decoder unit 12 still further produces and outputs branch address information onto a branch address bus 12-2. In a case of an unconditional branch instruction, information indicative thereof and the branch address information thereof are produced and outputted onto the buses and 13 and 12-2, respectively. The operation code information of each of the conditional and unconditional branch instruction is outputted onto the bus 12-1.

The decoded instruction information thus outputted onto the bus 15 is latched in the instruction latch 15 in response to a write-enable signal WE from the latch control unit 18. The information thus latched in the latch 15 is read out therefrom in response to a read-enable signal RE from the unit 18 and then supplied to the sequence controller 21 and further to the multiplexer 20. The decoded instruction information includes a certain bit indicating whether the instruction to be executed is performed by the corresponding string of microinstructions or by a hard-wired logic circuit. When the instruction is to be executed by the microinstructions, predetermined bits of the decoded instruction information are used as a leading address of the microprogram memory in the controller 21. The string of microinstructions corresponding thereto are thus read out therefrom and outputted from the controller 21 as control signal information. At this time, the multiplexer selects the controller 21 and hence each control signal information is transferred to the execution unit 23 through the control bus 22. Since each control signal information includes micro-address information indicative of a next microinstruction, that address information is fed back to the controller 21 as shown. On the other hand, in the case of the instruction to be executed by the hard-wired logic circuit, the decoded instruction information is transferred to the execution unit 23 through the selector 20 and the control bus 22 as control signal information. Thus, the execution unit 23 executes a desired processing operation corresponding to the macroinstruction.

The execution status of the unit 23 is temporarily stored in the PSW 24. The PSW 24 is composed of a plurality of bits (all not shown) respectively representing whether or not the operation resultant data is negative, whether or not the operation resultant data is zero, whether or not a carry occurs in the operation resultant data, whether or not a overflow occurs. The PSW 24 further includes bits representing the occurrence of a zero division, the occurrence of an invalid operation, the mask information of each maskable interrupt requests, the occurrence of a non-maskable interrupt request, and so forth. The content of the PSW 24 is used for judging whether a branch is to be taken or not.

The latch control unit 18 responds to the control signal information on the control bus 22 and produces and outputs the write-enable signal WE and the read-enable signal RE for the latch 15. The write-enable signal causing the latch 15 to store or latch the decoded instruction information from the decoder unit 12 further causes the branch detector 14 to output a detection signal 14-1 representing whether or not the branch condition is satisfied by comparing the decoded branch condition information on the bus 13 with the content of the PSW 24. That is, the timing of the latch 15 for latching the branch instruction is in synchronism with the timing of the branch detector 14 for outputting the detection signal 14-1. The detection signal thus outputted is supplied to the outside of the processor through the output buffer 4 as a first pipeline-flash signal PIPFLSHI 1 indicative of the initialization of a pipeline process. The read-enable signal RE from the controller 18 causing the latch 15 to read out and supply the instruction stored therein to the sequence controller 21 is also outputted to the outside of the processor through the output buffer 5 as an instruction execution start signal EXEST 3.

The flag hazard detection unit 60 detects whether or not at least one of the two instructions preceding the conditional branch instruction may change the content of the PSW 24. Specifically, each decoded instruction information has a flag hazard bit which indicates, when taking an active level, that the instruction may change the content of the PSW 24 like an addition instruction, a subtraction instruction, a multiplication instruction, a division instruction, and so forth. Accordingly, the detection unit 60 produces an active detection signal 64 when it receives the information indicative of the decoding of the conditional branch instruction through a signal line 61 and at least one of the flag hazard bits from signal lines 62 and 63 taking the active level. The flag hazard bit 63 is supplied from a latch 70 into which the flag hazard bit of the instruction which is being executed currently is latched. The active detection signal 64 is supplied through the control bus 22 to the latch control unit 18, the decoder unit 12 and the bus control unit 9. As a result, the pipelined processing operations from the instruction fetch cycle to the decoding cycle are locked and further the latch control unit 18 holds the write-enable signal WE at an inactive level during two pipeline-clock periods, which will be described later.

The input buffer 29 are supplied with a maskable interrupt request signal INT 27 and a non-maskable interrupt request signal NMI 28 and transfers them to the interrupt decoder 25. This decoder 25 decodes the interrupt request signal supplied thereto and informs the sequence controller 21 of the occurrence of the interrupt request through an interrupt request bus 25-1. In response thereto, the sequence controller 21 initiates an interrupt operation and produces and supplies an interrupt code to the control bus 22 through the selector 20. As a result, an interrupt operation is executed. The sequence controller 21 further responds to the occurrence of an exception operation and produces and supplies an exception code to the control bus 22. The exception operation is thus executed. These interrupt and exception codes are decoded by the decoder 26, the output of which is then supplied to the outside of the processor through the output buffer 6 as a second pipeline-flash signal PIPEFLSHE 2 indicative of the initialization of a pipeline process.

Figure 3:
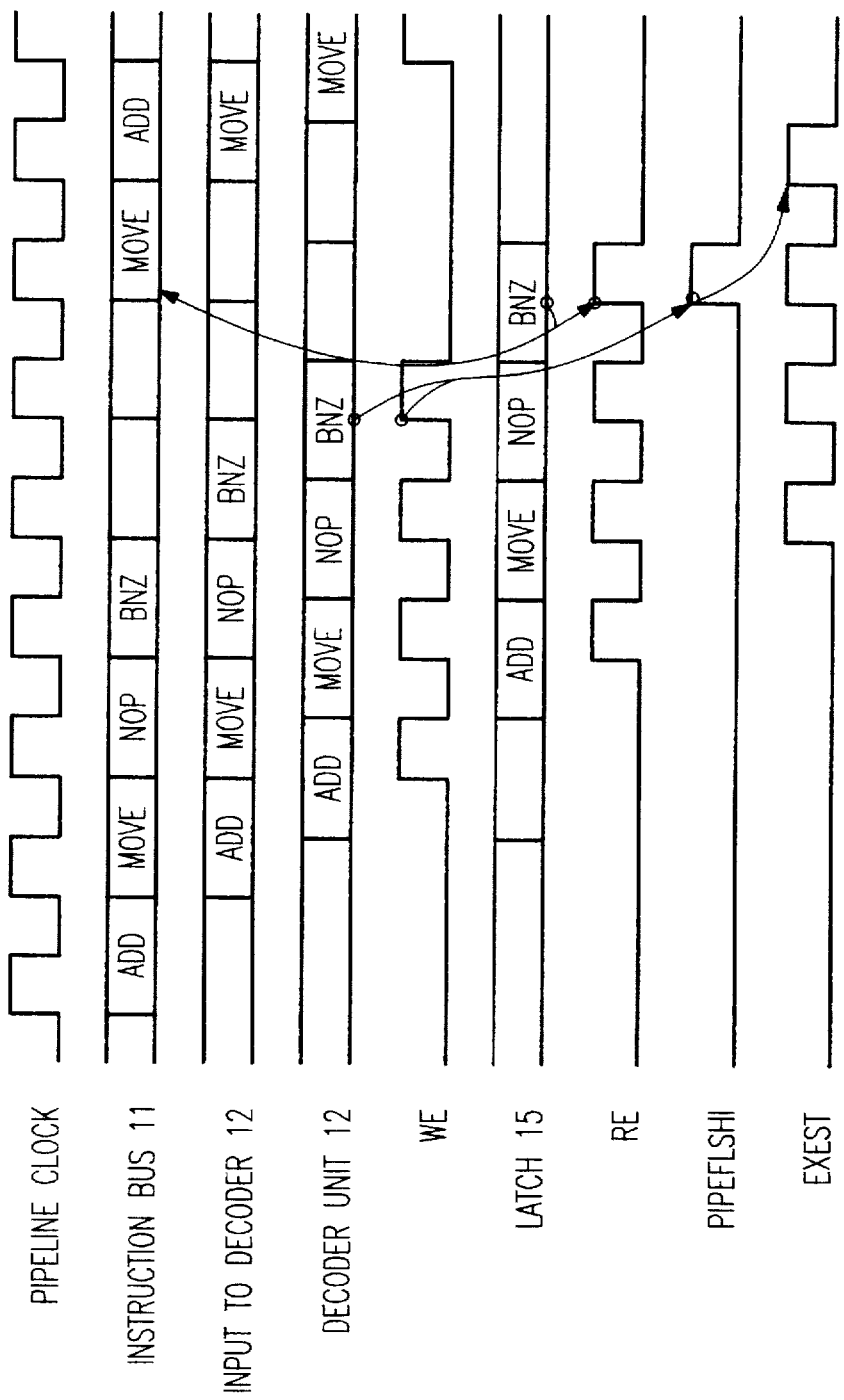
FIG. 3 is a timing/state chart for explaining an operation of the microprocessor shown in FIG. 2.

Description will be now made on an operation of the microprocessor shown in FIG. 2 with reference also to FIG. 3. FIG. 3 illustrates the states of the respective pipeline stages and the wave-forms of the signals WE, RE, PIPEFLSHI and EXEST in the course of executing a sequence of instructions consisting of an addition instruction ADD, a moving instruction MOVE, a no-operation instruction NOP and a conditional branch instruction BNZ. This conditional branch instruction BNZ causes a branch to be taken if the zero flag bit contained in the PSW 24 is in the inactive level to indicate that the resultant data of an operation is not zero.

As described above, the bus control unit 9 performs a bus cycle to fetch a string of instructions. If the instructions to be executed are copied in the cache memory unit 10, the access to the external memory is not carried out, and the access to the cache memory unit 10 is performed, instead. In order to facilitate the explanation, it is assumed that the above-mentioned sequence of instructions are copied in the cache memory unit 10. The access to read out the instruction from the cache memory unit 10 is performed in one pipeline-clock. The ADD instruction is thus read out from the cache memory unit 10 and transferred to the instruction bus 11, as shown in FIG. 3. It should be noted that the access to the cache memory unit 10 is carried out in word units and hence the instruction code may contain instruction code data other than the ADD instruction. Therefore, although not shown in FIG. 2, there is provided an alignment unit to align the instruction code data from the cache memory unit 10 and to supply only necessary instruction code data to the decoder unit 25. This alignment operation needs a half pipeline-clock period. Accordingly, the decoder unit 25 receives the ADD instruction in one and half pipeline-clock periods from the initiation of the access to the cache memory unit 10, as shown in FIG. 3. The decoder unit 12 thus starts the decoding of the ADD instruction. During the decoding, the access to the cache memory unit 10 is being performed to fetch the NOP instruction in accordance with the pipelined manner.

The latch control unit 18 generates the write-enable signal WE in a half pipeline-clock period from the start of the ADD instruction decoding, as shown in FIG. 3. This signal WE is further supplied to the branch detection unit 14. Since the ADD instruction is being decoded, the data on the bus 13 has a default value. Accordingly, the signal PIPEFLSHI is at the inactive low level, as shown in FIG. 3. The latch control unit 18 further generates the read-enable signal RE in one pipeline-clock after the generation of the write-enable signal WE. The ADD instruction is thereby read out from the latch 15 and then supplied to the sequence controller 21. In response further to the signal RE, the output buffer 5 generates the execution start signal EXEST 3 after one pipeline clock, as shown in FIG. 3.

When the sequence controller 21 receives the ADD instruction, it initiates reading out the sequence of microinstructions corresponding thereto, which are in turn supplied to the execution unit 23 through the selector 20 and the control bus 22. The flag hazard bit of the ADD instruction is latched in the latch 70. Thus, the ADD instruction is executed, wherein source and destination operand data of source and destination addresses are accessed and transferred to an arithmetic and logic unit (not shown) in the unit 23 and the resultant data is written back to the source address. The string of operations for the ADD instruction are performed by the microinstructions within one pipeline clock. That is, the sequence of microinstructions for each macroinstruction are read out and executed in response to a machine clock (not shown) having a frequency higher than the pipeline clock.

In a similar manner as described above, the pipeline processing operations of each of the MOVE, NOP and BNZ instructions are performed. When the decoder unit 12 receives the BNZ instruction, it supplies the branch condition information to the branch detection unit 14 and the branch address information to the branch address generation unit 50. At this time, since each of the MOVE and NOP instructions does not change the content of the PSW 24, and hence each of the flag hazard bit thereof takes the inactive level. Accordingly, no flag hazard occurs and thus the latch control unit 18 generates the write-enable signal WE, as shown in FIG. 3. In response thereto, the detection unit 14 produces the detection signal indicative of whether or not the branch condition is satisfied. In the present description, the ZERO bit of the PSW 24 is in the inactive level to represent that the resultant data by the ADD instruction is not zero. The detection signal from the unit 14 thereby takes the active high level. The output buffer 4 generates the pipeline flash signal PIPEFLSHI 1 in one pipeline clock, as shown in FIG. 3. Thus, it is informed outside that the pipeline processing operations are initialized by the conditional branch instruction BNZ. Since the latch control unit 18 produces the read-enable signal RE for the BNZ instruction in one pipeline clock after the generation of the write-enable signal WE, the signal PIPEFLSHI 1 is generated in synchronism with the signal RE, and the execution start signal EXEST 3 is generated in one pipeline clock after the generation of the signal PIPEFLSHI 1, as shown in FIG. 3.

By the BNZ instruction being supplied to the execution unit 23 receiving the active branch detection from the unit 14, the unit 23 commands the bus control unit 9 to perform the bus cycle for fetching a branch target instruction at the branch address from the address generator 50. As a result, another MOVE instruction as the branch target instruction is fetched and supplied to the decoder unit 12, as shown in FIG. 3. The instructions, an ADD instruction and a NOP instruction, succeeding the MOVE instruction are further fetched and executed in a pipelined manner, as shown in FIG. 3.

In the case where the branch condition of the BNZ instruction is not satisfied, the pipeline processing operations for the instructions (not shown) succeeding thereto continues.

Figure 4:
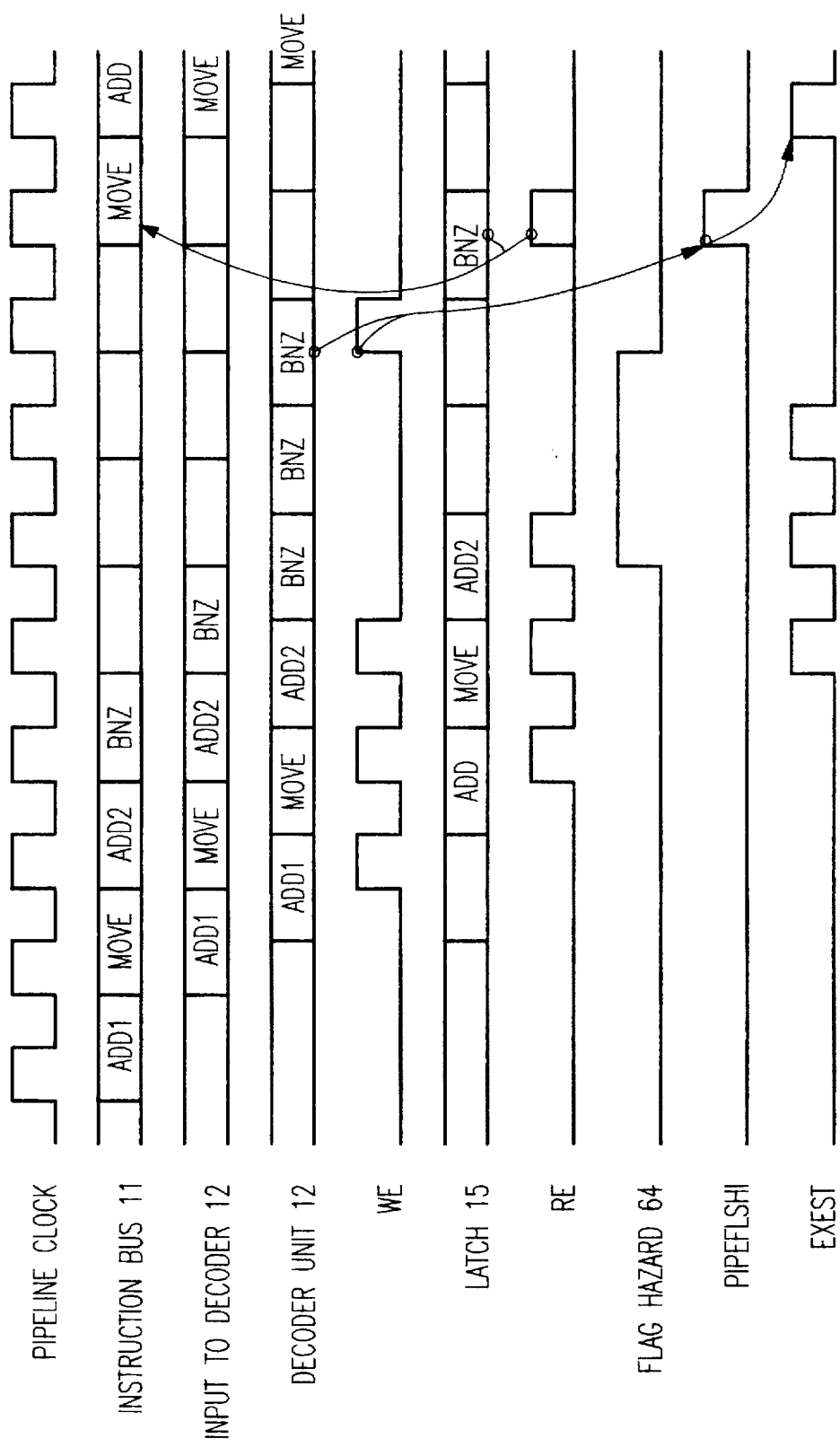
FIG. 4 is a timing/state chart for explaining another operation of the microprocessor shown in FIG. 2.
Figure 5:
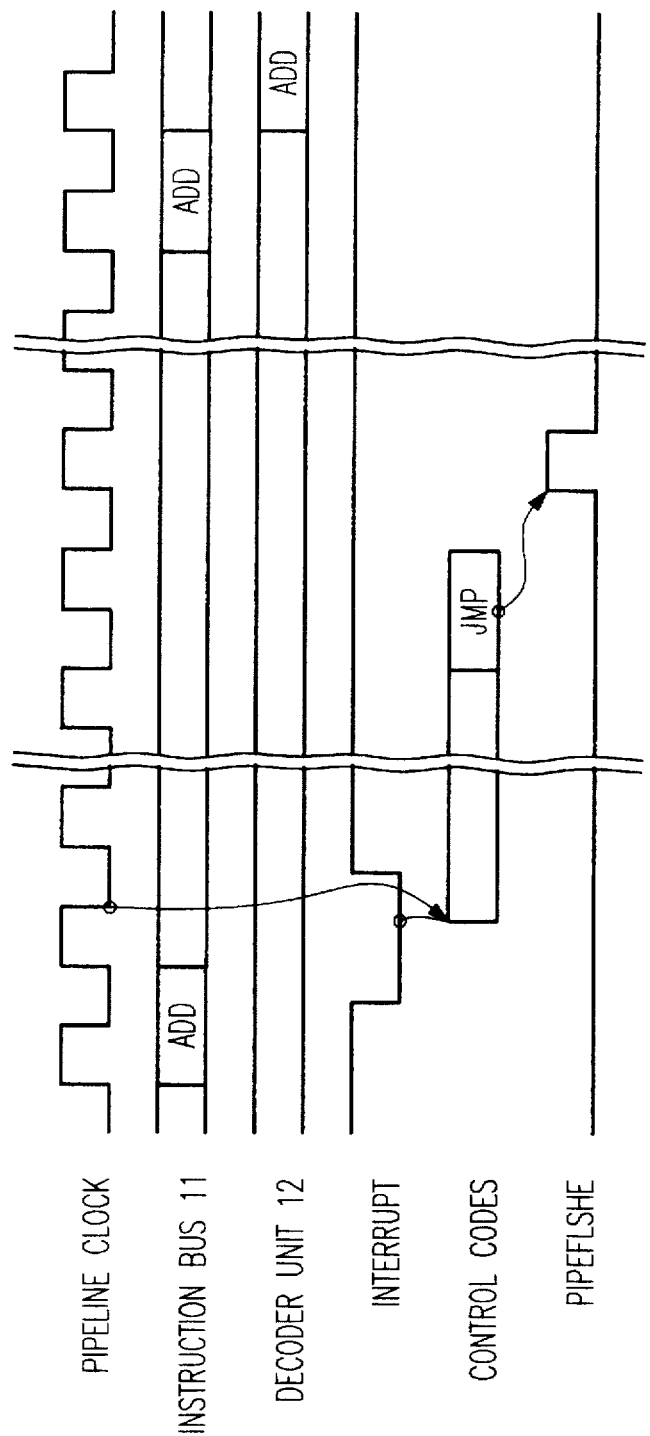
FIG. 5 is a timing/state chart for explaining still another operation of the microprocessor shown in FIG. 2.

Description will be further made on another string of instructions with reference to FIG. 4. The string of instructions shown therein are composed of an ADD1 instruction, a MOVE instruction, an ADD2 instruction and a BNZ instruction. The ADD2 instruction may change the content of the PSW 24. That is, the flag hazard bit of the decoded ADD2 instruction takes the active level. Accordingly, the flag hazard is detected by the detection unit 60 during decoding the BNZ instruction. The write-enable signal WE for writing the BNZ instruction into the latch 15 is thereby held at the inactive low level during two pipeline clocks, as shown in FIG. 4. During that period, the content of the PSW 24 is settled, and the write-enable signal WE is generated. In response thereto, the detection unit 14 produces the detection signal 14-1 indicative of whether the branch condition is satisfied or not. If the branch condition is satisfied, the pipeline flash signal PIPEFLSHI is generated and a target MOVE instruction is fetched in the manner as described above.

Thus, each time the conditional branch instruction is executed as a branch being taken or an unconditional branch instruction is executed, the pipeline flash signal PIPEFLSHI 1 is generated in synchronism with the write-enable signal WE and the execution start signal EXEST is generated just after the signal PIPEFLSHI. Therefore, it becomes possible to trace the string of the instructions actually executed.

When the interrupt request occurs during the execution of instructions, the interrupt decoder unit 25 decodes the interrupt request and commands the sequence controller 21 to initiate the interrupt control operation through the bus 25-1. In response thereto, the controller 21 suspends the execution of the instructions and outputs a string of control codes for interrupt to the control bus 22, as shown in FIG. 4. Similarly, in response to the occurrence of the operation exception, the sequence controller 21 generates a string of control codes for exception to the control bus 22. These control codes include ones for saving the current execution status of the execution unit 23 and further include a control jump code JPM as a final control code. This control jump code JPM commands the bus control unit 9 to fetch a string of instructions for an interrupt or an operation exception. The control jump code JPM is further supplied to and thus decoded by the decoder 26. The decoder 26 generates the active signal indicative of the occurrence of the control code branch signal. This active signal is outputted outside as the pipeline flash signal PIPEFLSHE 2, as shown in FIG. 4. By monitoring the signal PIPEFLSHE 2, therefore, it is detected that the interrupt or operation exception has occurred and the instructions which have already been fetched are not executed. After termination of the instructions for the interrupt operation or the exception operation, the saved content are returned. Thus, the suspended program execution is restarted.

Figure 1:
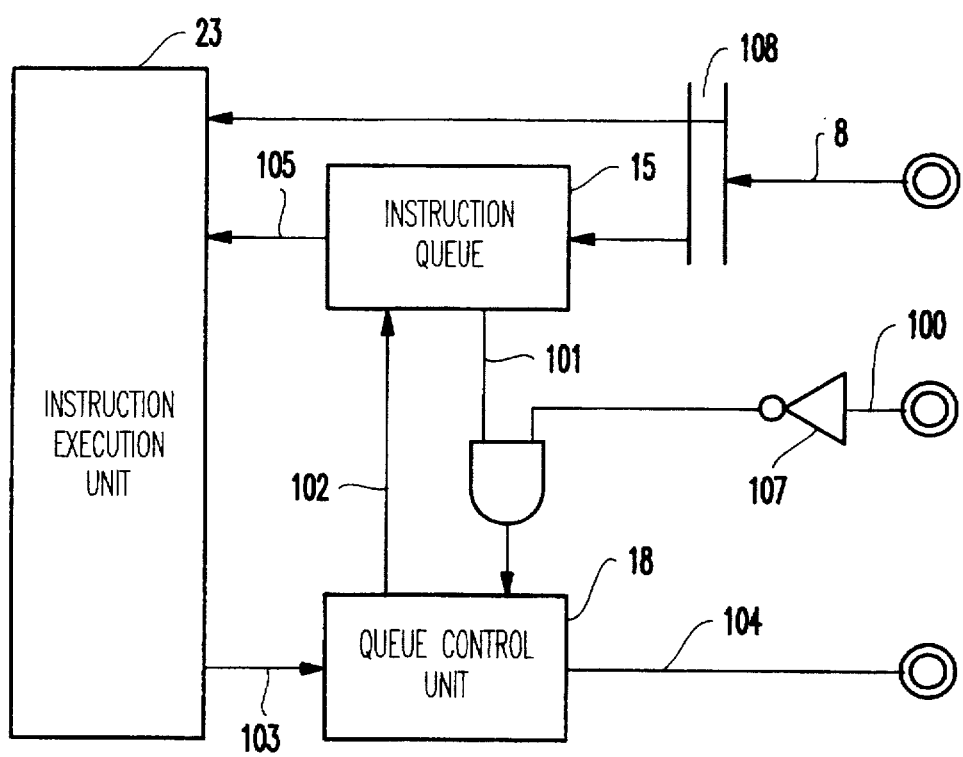
FIG. 1 is a block diagram illustrative of a microprocessor according to the prior art.

It is apparent that the present invention is not limited to the above embodiment but may be modified and changed without departing from the scope and spirit of the present invention. For example, the latch 15 can be replaced by an instruction queue having a plurality of buffer stages. In this case, such a signal that is used for writing the decoded instruction into the final buffer stage of the instruction queue is employed as the signal for commanding the branch detection unit 14 to produce the signal indicative of whether the branch condition is satisfied or not. By using this instruction queue, the so-called instruction prefetch operation is carried out similarly to the microprocessor shown in FIG. 1.

What is claimed is:

1. A microprocessor comprising:

an instruction decoder unit receiving instructions and producing decoded instruction information of each of said instructions, said decoder unit further producing, when receiving a conditional branch instruction, branch condition information designated by said conditional branch instruction;

storage means, coupled to said instruction decoder unit, for temporarily storing said decoded instruction information in response to a write-enable signal and reading out said decoded instruction information therefrom in response to a read-enable signal;

execution means, coupled to said storage means, for executing an instruction in response to the decoded instruction information read out from said storage means, said execution means having a program status word register for temporarily storing an execution state of said execution means;

a branch detection unit detecting whether or not said branch condition information produced by said instruction decoder unit corresponds to said execution state stored in said program status word register and responding to said write-enable signal to generate a detection signal when said branch condition information corresponds to said execution state such that said storing of said decoded instruction information in said storage means and said detecting by said branch detection unit are synchronized by said write-enable signal; and an output buffer, coupled to said branch detection unit, for generating a pipeline-flash signal in response to said detection signal and outputting said pipeline-flash signal to an exterior of said microprocessor.

2. The microprocessor as claimed in claim 1, further comprising a flag hazard detector generating flag hazard information when a content of said program status word register may be changed by an instruction which is executed before said conditional branch instruction and means responsive to said flag hazard information for suspending generation of said write-enable signal.

3. The microprocessor as claimed in claim 2, wherein said flag hazard detector generates said flag hazard information in response to the decoded instruction information read out from said storage means and the decoded instruction information of an instruction which is being executed by said execution means.

4. The microprocessor as claimed in claim 1, further comprising means for generating an execution start signal in response to said read-enable signal.

5. The microprocessor as in claim 4, wherein said execution means reads said decoded instruction from said storage means in response to said read-enable signal, such that said execution means executes said instruction in synchronism with said generation of said execution start signal.

6. The microprocessor as in claim 1, wherein program status word register includes information regarding whether said conditional branch instruction is to be executed.

7. A microprocessor comprising:

a decoder for receiving a first instruction, for producing a second instruction which is decoded from said first instruction and for producing branch information when receiving a branch instruction;

a storage coupled to said decoder for storing said second instruction in response to a first signal and reading out said second instruction in response to a second signal;

execution means coupled to said storage for executing said second instruction and for storing at least one execution state of said execution means to a register; and a first detector for generating a detection signal responding to said first signal when said branch information corresponds with said execution state and outputting said detection signal to an exterior of said microprocessor, wherein said storing of said second instruction in said storage and said generating of said detection signal by said first detector are synchronized by said first signal.

8. The microprocessor as claimed in claim 7, further comprising:

a second detector for generating flag hazard information when an execution state of said register is changed by an instruction which is executed before said branch instruction; and a third detector for suspending generation of said first signal in response to said flag hazard information.

9. The microprocessor as claimed in claim 8, wherein said second detector generates said flag hazard information in response to said second information read out from said decoder and said second information being executed by said execution means.

10. The microprocessor as claimed in claim 9, further comprising:

a first buffer coupled to said first detector for generating a third signal to an exterior of said microprocessor in response to said detection signal.

11. The microprocessor as claimed in claim 10, further comprising:

a second buffer coupled to said storage for generating a fourth signal to the exterior of said microprocessor in response to said second signal.

12. The microprocessor as in claim 11, wherein said execution means reads said second instruction from said storage in response to said second signal, such that said execution means executes said second instruction in synchronism with said generation of said fourth signal.

13. The microprocessor as in claim 7, wherein said execution state includes information regarding whether said branch instruction is to be executed.

14. A microprocessor comprising:

execution means for executing each of a plurality of instructions transmitted from outside of said microprocessor;

a register coupled to said execution means for storing an execution state of said execution means;

a first detector for generating flag hazard information when said execution state is changed by one of said instructions which is not a branch instruction and which is being executed by said execution means;

a second detector for suspending transmittance of said instructions to said execution means in response to said flag hazard information, wherein said second detector comprises:

a decoder for receiving said instructions transmitted from outside of said microprocessor, for producing decoded instruction which is decoded from said instructions and for producing branch information when receiving a branch instruction;

a storage coupled to said decoder for storing said decoded instruction in response to a first signal and reading out said second instruction to said execution means in response to a second signal; and a signal generator for alternately generating said first and second signals and for suspending generation of said first signal in response to said flag hazard information;

said microprocessor further comprising a third detector, connected to said register and said decoder, for generating a detection signal responding to said first signal when said branch information corresponds with said execution state and outputting said detection signal to an exterior of said microprocessor, wherein said storing of said second instruction in said storage and said generating of said detection signal by said detector are synchronized by said first signal.

15. The microprocessor as claimed in claim 12, wherein said first detector generates said flag hazard information in response to said decoded information read out from said decoder and said decoded information being executed by said execution means.

16. The microprocessor as claimed in claim 15, further comprising:

a first buffer coupled to said third detector for generating a third signal to an exterior of said microprocessor in response to said detection signal.

17. The microprocessor as claimed in claim 16, further comprising:

a second buffer coupled to said signal generator for generating a fourth signal to the exterior of said microprocessor in response to said second signal.

18. The microprocessor as in claim 17, wherein said execution means reads said second instruction from said storage in response to said second signal, such that said execution means executes said second instruction in synchronism with said generation of said fourth signal.

19. The microprocessor as in claim 14, wherein said execution means includes means for storing at least one execution state of said execution means, said execution state including information regarding whether said branch instruction is to be executed.

20. The microprocessor as in claim 19, wherein said one of said instructions which is not a branch instruction is an instruction preceding said branch instruction.

21. The microprocessor as in claim 20, wherein said first detector generates said flag hazard when said instruction preceding said branch instruction will modify said execution state.

* * * * *